(12) United States Patent
Matsushita et al.

(10) Patent No.: US 8,081,814 B2
(45) Date of Patent: Dec. 20, 2011

(54) LINEAR PATTERN DETECTION METHOD AND APPARATUS

(75) Inventors: Hiroshi Matsushita, Hiratsuka (JP); Kenichi Kadota, Yokohama (JP); Toshiyuki Aritake, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 367 days.

(21) Appl. No.: 12/393,797

(22) Filed: Feb. 26, 2009

(65) Prior Publication Data
US 2009/0220142 A1 Sep. 3, 2009

(30) Foreign Application Priority Data
Feb. 29, 2008 (JP) .................................. 2008-049901

(51) Int. Cl.
*G06K 9/00* (2006.01)
*G01N 21/00* (2006.01)

(52) U.S. Cl. ..................... 382/149; 382/141; 356/237.4

(58) Field of Classification Search .................. 382/149, 382/141, 144–148; 700/110, 104; 702/185; 356/237.1–237.5; 438/5, 8, 14
See application file for complete search history.

(56) References Cited

U.S. PATENT DOCUMENTS

| | | | | |
|---|---|---|---|---|
| 5,841,893 | A * | 11/1998 | Ishikawa et al. | 382/145 |
| 5,982,920 | A * | 11/1999 | Tobin et al. | 382/145 |
| 5,991,699 | A * | 11/1999 | Kulkarni et al. | 702/83 |
| 6,016,562 | A * | 1/2000 | Miyazaki et al. | 714/724 |
| 6,611,728 | B1 * | 8/2003 | Morioka et al. | 700/109 |
| 6,797,526 | B2 * | 9/2004 | Tanaka et al. | 438/5 |
| 7,043,384 | B2 | 5/2006 | Matsushita et al. | |
| 7,062,081 | B2 * | 6/2006 | Shimoda et al. | 382/149 |
| 7,068,834 | B1 * | 6/2006 | Ikeda et al. | 382/145 |
| 7,187,438 | B2 * | 3/2007 | Hamamatsu et al. | 356/237.4 |
| 7,221,991 | B2 | 5/2007 | Matsushita et al. | |
| 7,222,026 | B2 | 5/2007 | Matsushita et al. | |
| 7,405,088 | B2 | 7/2008 | Matsushita et al. | |
| 7,577,486 | B2 * | 8/2009 | Toyofuku | 700/110 |
| 7,813,539 | B2 * | 10/2010 | Shibuya et al. | 382/141 |
| 2006/0281199 | A1 | 12/2006 | Matsushita et al. | |

FOREIGN PATENT DOCUMENTS

| | | |
|---|---|---|
| JP | 62-200740 | 9/1987 |
| JP | 2002-82064 | 3/2002 |
| JP | 2003-59984 | 2/2003 |

OTHER PUBLICATIONS

Notification of Reasons for Rejection issued by the Japanese Patent Office on Aug. 6, 2010, for Japanese Patent Application No. 2008-049901, and English-language translation.

\* cited by examiner

*Primary Examiner* — Sang Nguyen
(74) *Attorney, Agent, or Firm* — Finnegan, Henderson, Farabow, Garrett & Dunner, L.L.P.

(57) ABSTRACT

The present invention provides a linear pattern detection method which can extract and detect linear patterns distinguished by a microscopic defect distribution profile even if skipped measurements are taken. The linear pattern detection method acquires a defect map created based on results of defect inspection of a wafer; divides the defect map into a plurality of first segments; calculates a correlation coefficient of a point sequence in each of the first segments, the point sequence corresponding to a defect group contained in the first segments; calculates a total number of those first segments in which the correlation coefficient is equal to or larger than a first threshold; and determines that the wafer contains a linear pattern if the total number is equal to or larger than a second threshold.

17 Claims, 14 Drawing Sheets

| LINEAR PATTERN TYPE | WAFER ID | MANUFACTURING APPARATUS ID | DEFECT MAP | |
|---|---|---|---|---|
| TYPE I | 2, 5 | A | WAFER ID=2 | WAFER ID=5 |
| TYPE II | 4, 1 | B | WAFER ID=4 | WAFER ID=1 |
| TYPE III | 6, 3 | C | WAFER ID=6 | WAFER ID=3 |

FIG. 13

LINEAR PATTERN DETECTION METHOD AND APPARATUS

CROSS-REFERENCE TO RELATED APPLICATION

This application is based upon and claims the benefit of priority from prior Japanese Patent Application No. 2008-49901, filed on Feb. 29, 2008, the entire contents of which are incorporated herein by reference.

BACKGROUND OF THE INVENTION

1. Field of the Invention

The present invention relates to a method and apparatus for detecting linear patterns.

2. Background Art

One of the greatest challenges in increasing productivity of LSI manufacturing is to improve yields. To improve yields, it is important to analyze yield loss, identify processes and manufacturing apparatuses which have been causing the yield loss at an early stage, and make improvements. However, an LSI chip is produced through hundreds of processes using hundreds of manufacturing apparatuses. Thus, once a defective LSI chip is detected, it is generally a very difficult task to identify the cause.

To deal with this, when a process is finished, defect inspection is carried out to check whether the process has been performed properly. The defect inspection is carried out optically and/or by an electron-beam technique to check a circuit pattern for any abnormality or foreign matter. The abnormality or foreign matter detected in this way is referred to as a defect. When a defect is detected, coordinates of the defect on a wafer are recorded. Defects displayed on a wafer map using recorded coordinate information are referred to as a defect map.

Defect distributions on defect maps are broadly divided into two types. One of the types involves random defects which are distributed evenly irrespective of locations on the wafer. The other type involves clustered defects which are distributed unevenly.

It has been pointed out that defects attributable to a specific process or manufacturing apparatus leave a "fingerprint" as a defect distribution on the defect map. That is, any defective condition of a process or manufacturing apparatus shows up as clustered defects unique to the process or manufacturing apparatus. Thus, classification of clustered defects provides a clue to causes of the defects.

Typical clustered defects include a linear pattern. Defects of a linear pattern are placed along a line or arc. Thanks to their characteristic shape, linear patterns, when detected, often enable identifying the process or manufacturing apparatus causing reduced yields.

Microscopically, linear patterns are divided into three types. Microscopically, the linear pattern of the first type has defects placed at small intervals without scattering. Macroscopically, the linear pattern of the first type is a sharp, clear linear pattern. Microscopically, the linear pattern of the second type has defects placed at slightly wide intervals, being scattered to some extent. Macroscopically, the linear pattern of the second type is not much different from the linear pattern of the first type. Microscopically, the linear pattern of the third type has defects placed at wide intervals. Macroscopically, the linear pattern of the third type is a faint linear pattern.

Conventional methods for detecting linear patterns include, for example, a method which uses Hough transform (Japanese Patent Laid-Open No. 2003-59984). However, the conventional method cannot detect the linear pattern of the first type and the linear pattern of the second type by making a distinction between them. Also, it is difficult for the conventional method to detect the linear pattern of the second type and the linear pattern of the third type. Furthermore, the conventional method cannot detect any of the linear patterns if the linear pattern is buried in random defects of high density.

Also, conventionally, when skipped measurements are taken in defect inspection, since the linear pattern is divided in the middle, it is not possible to detect the linear pattern. Skipped measurements are taken when defect inspection is conducted on only part of semiconductor chips on a wafer surface to reduce inspection time.

SUMMARY OF THE INVENTION

According to one aspect of the present invention, there is provided a linear pattern detection method including: acquiring a defect map created based on results of defect inspection of a wafer; dividing the defect map into a plurality of first segments; calculating a correlation coefficient of a point sequence in each of the first segments, the point sequence corresponding to a defect group contained in the first segments; calculating a total number of those first segments in which the correlation coefficient is equal to or larger than a first threshold; and determining that the wafer contains a linear pattern if the total number is equal to or larger than a second threshold.

According to another aspect of the present invention, there is provided a linear pattern detection method including: acquiring a defect map created based on results of defect inspection of a wafer; dividing the defect map into a plurality of first segments; extracting those first segments which contain an equal or larger number of defects than a predetermined threshold as effective segments; creating joint segments by joining adjacent effective segments; applying an outlier rejection algorithm to the joint segments to extract only defects which form a linear pattern from a defect group, contained in the joint segments; calculating a correlation coefficient of a point sequence in each of the joint segments, the point sequence corresponding to a defect group contained in the joint segments; calculating a total number of effective segments in those joint segments in which the correlation coefficient is equal to or larger than a first threshold; and determining that the wafer contains a linear pattern if the total number is equal to or larger than a second threshold.

According to still another aspect of the present invention, there is provided an analyzing apparatus including: a defect map input unit which acquires a defect map associated with a wafer ID from a defect map database; a linear pattern type determining unit which performs a detection method for detecting, based on the defect map, whether at least one of a plurality of types of linear pattern is present, and stores a first data structure in a linear pattern type determination result database, the first data structure representing a type of linear pattern detected on each wafer; a common manufacturing apparatus searching unit which acquires the first data structure from the linear pattern type determination result database, acquires a second data structure that represents the wafer ID of the wafer processed by each manufacturing apparatus represented by a manufacturing apparatus ID from a manufacturing apparatus history database, and performs a search process to search for a manufacturing apparatus common to linear patterns of each type based on the first and second data structures, and stores a third data structure in a common manufacturing apparatus search result database based on results of the search process, the third data structure representing the manufacturing apparatus ID of a manufacturing apparatus common to linear patterns of each type; and a result output unit which outputs analysis results obtained by organizing the first data structure, the second data structure, and the third data structure to a user terminal.

BRIEF DESCRIPTION OF THE DRAWINGS

FIG. 13 is a diagram showing results outputted from the analyzing apparatus according to the fourth embodiment.

DESCRIPTION OF THE EMBODIMENTS

Embodiments of the present invention will be described below with reference to the drawings.

In first to third embodiments, description will be given of methods for detecting linear patterns which differ in a microscopic defect distribution profile. In a fourth embodiment, description will be given of a method for identifying a manufacturing apparatus which has caused defects based on a linear pattern detected by the detection methods according to the first to third embodiments as well as of an analyzing apparatus used by the method.

Incidentally, numeric values cited in the description of the embodiments are only exemplary and are not intended to limit the present invention.

First Embodiment

Figure 3:
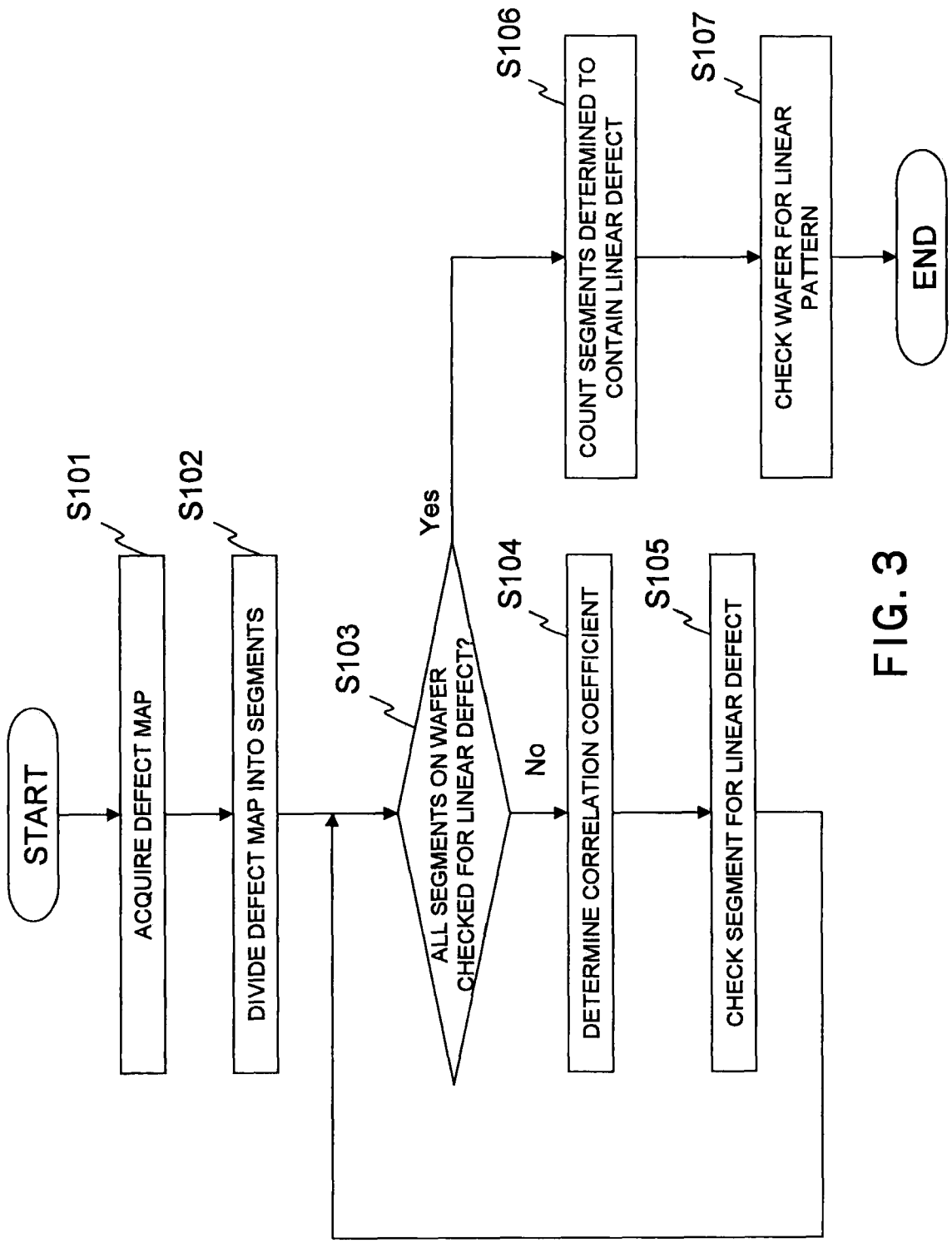
FIG. 3 is a flowchart of a detection method according to a first embodiment.

A linear pattern detection method according to the first embodiment will be described with reference to a flowchart in FIG. 3. The detection method according to the present embodiment detects a linear pattern which contains defects placed at small intervals without scattering when viewed microscopically, and which is a sharp, clear linear pattern when viewed macroscopically.

Figure 1:
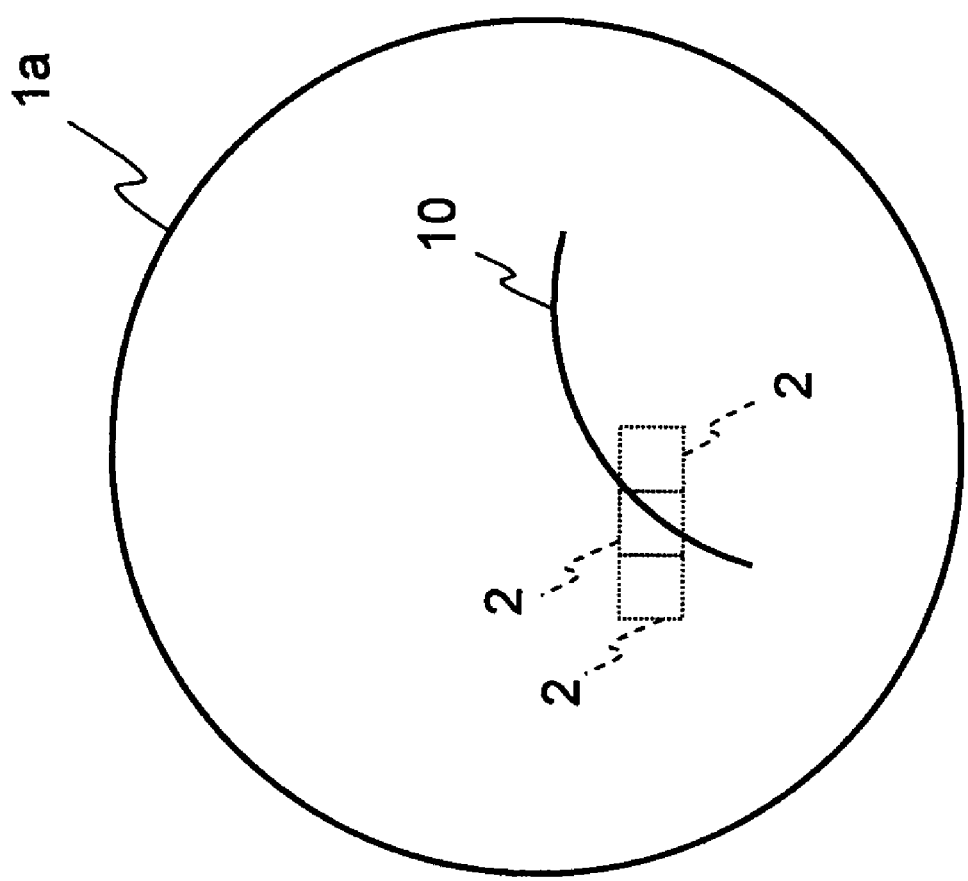
FIG. 1 is a diagram showing an example of a defect map.

First, the detection method acquires a defect map containing coordinate data on defects detected as a result of defect inspection (Step S101). FIG. 1 shows a defect map obtained in this way. It can be seen from FIG. 1 that there is a slightly curved linear pattern 10 on a wafer map 1a.

Next, to view the linear pattern 10 microscopically, the detection method divides the acquired defect map into segments (Step S102). A region 2 occupied by each semiconductor chip formed on a wafer is divided into $m_1$ by $m_1$ sub-regions ($m_1$=10), which constitute segments according to the present embodiment. Incidentally, the regions to be divided are not limited to those occupied by semiconductor chips.

Figure 2:
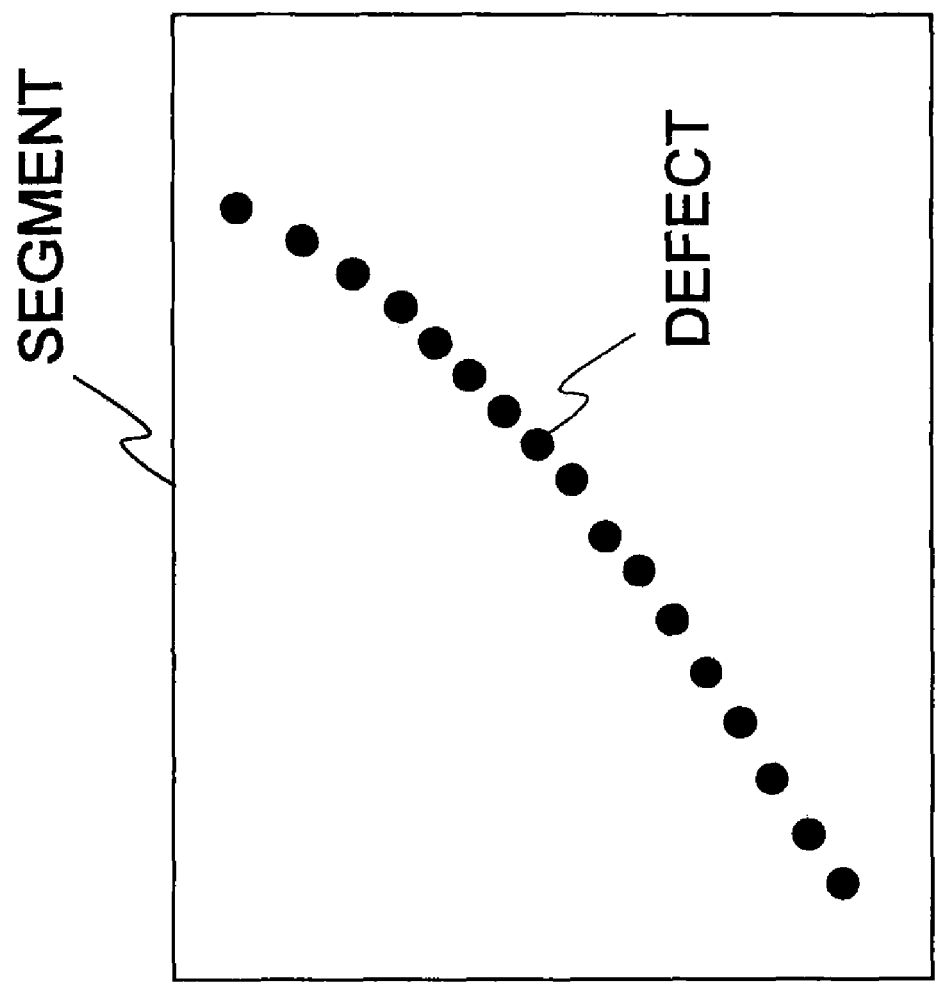
FIG. 2 is a diagram showing a distribution of defects in a segment.

FIG. 2 shows a segment on which a linear pattern is present. Black spots represent defects. Since the segment is a microscopic region, defects in the region are placed regularly almost along a straight line. Thus, defects other than the defects of the linear pattern are rarely mixed in.

Next, the detection method determines whether all segments on the wafer have been checked for a linear defect (Step S103). If all the segments have been checked, the detection method goes to Step S106. Otherwise, the detection method goes to Step S104.

In Step S104, the detection method determines a correlation coefficient for a defect group in each segment. That is, by regarding the defect group as a point sequence, the detection method determines regularity of point distribution in the point sequence using a correlation coefficient R given by Equation (1). The correlation coefficient R takes a value from 0 to 1 (both inclusive). The larger the value, the higher the regularity.

$$R = \frac{1}{n} \frac{\sum_i (x_i - \mu_x)(y_i - \mu_y)}{\sqrt{\left(\frac{\sum_i x_i^2}{n} - \mu_x^2\right)\left(\frac{\sum_i y_i^2}{n} - \mu_y^2\right)}} \quad (1)$$

where "i" is a defect number of a defect in the segment, "n" is the number of defects in the segment, $x_i$ and $y_i$ are respectively x and y coordinates, on the wafer map, of the i-th defect in the segment, and $\mu_x$ and $\mu_y$ are respectively average values of x and y coordinates of all the defects in the segment.

Next, the detection method checks the segment for any linear defect (Step S105). Specifically, by setting a threshold for the correlation coefficient R, the detection method determines that the segment contains a linear defect if the correlation coefficient determined in Step S104 is equal to or larger than the threshold. According to the present embodiment, the threshold for the correlation coefficient is 0.95. In the case of the defect group contained in the segment shown in FIG. 2, the correlation coefficient R is as high as 0.98, and thus it is determined that the segment contains a linear defect.

Regarding the other segments, the detection method similarly determines the correlation coefficient and checks for any linear defect. When all the segments on the wafer have been checked for a linear defect, the detection method goes to Step S106.

In Step S106, the detection method finds a count value by counting the total number of segments with a correlation coefficient equal to or larger than the threshold.

In Step S107, the detection method determines whether the wafer contains a linear pattern. Specifically, by setting a threshold for the count value, the detection method determines that the wafer contains a linear pattern if the count value determined in Step S106 is equal to or larger than the threshold. According to the present embodiment, the threshold for the count value is 10.

In the case of the defect map shown in FIG. 1, the count value is 60, and thus it is determined that the wafer contains a linear pattern.

The linear pattern detected by the detection method according to the first embodiment will be referred to as a type I linear pattern. Thus, it is determined that the wafer contains a type I linear pattern in the defect map shown in FIG. 1. The type I linear pattern is a sharp, clear linear pattern when viewed macroscopically, and a linear pattern containing defects placed at small intervals without scattering when viewed microscopically.

Also, the detection method according to the present embodiment can detect such a linear pattern even when skipped measurements are taken in defect inspection. For example, if defect inspection is conducted on every other segment line, the count value will be 30, which is larger than the count value threshold. Thus, the linear pattern can be detected sufficiently.

Also, the detection method according to the present embodiment can detect a type I linear pattern even if the defect map contains random defects. This is because since each segment according to the present embodiment is sufficiently small, the number of random defects in the segment is sufficiently smaller than the number of defects in the linear pattern.

As described above, by extracting features of the microscopic defect distribution profile, the first embodiment makes it possible to detect type I linear patterns even if skipped measurements are taken.

Second Embodiment

Next, a linear pattern detection method according to the second embodiment will be described. The detection method according to the present embodiment detects a linear pattern which is similar to the type I linear pattern when viewed macroscopically, but which contains defects placed at slightly wide intervals, being scattered to some extent of width when viewed microscopically.

Figure 4:
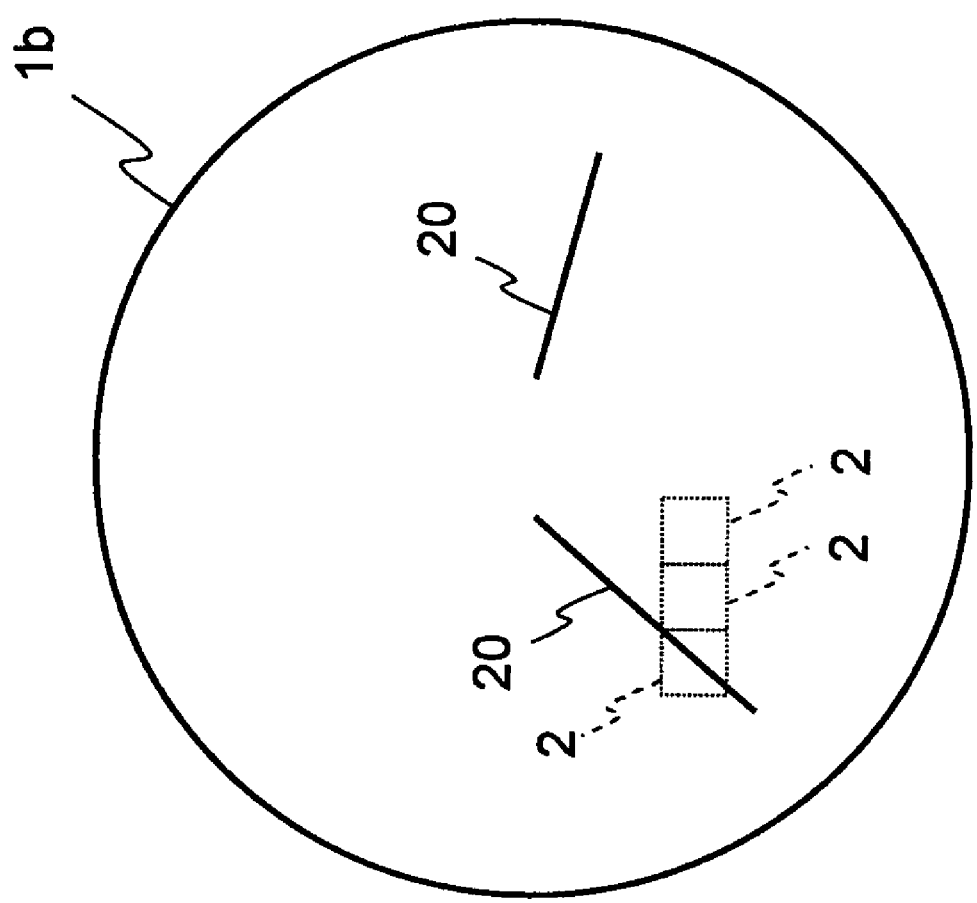
FIG. 4 is a diagram showing an example of a defect map.

FIG. 4 shows a defect map containing such linear patterns. It can be seen from FIG. 4 that there are two linear patterns 20 on a wafer map 1b. When the entire defect map is viewed broadly, the linear patterns 20 do not seem to be much different from the linear pattern 10 according to the first embodiment.

Figure 5:
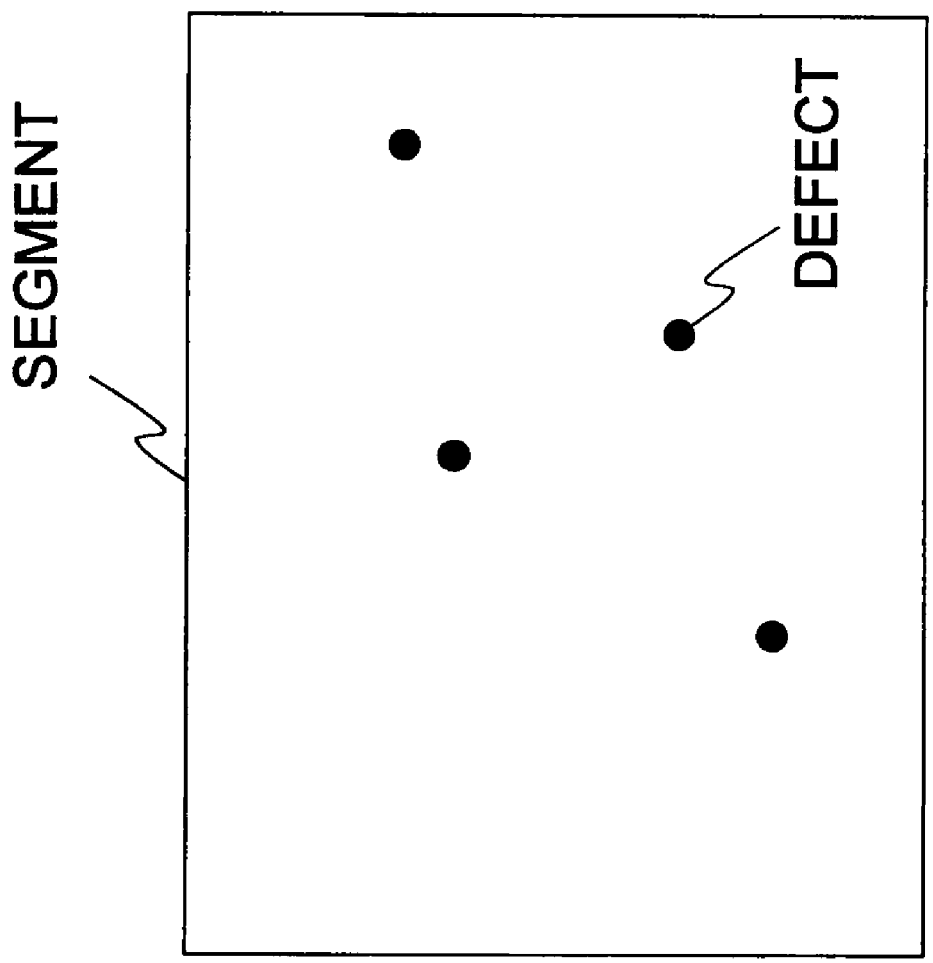
FIG. 5 is a diagram showing a distribution of defects in a segment of the same size as in the first embodiment.

First, a case will be described that the detection method according to the first embodiment is used for the defect map shown in FIG. 4. FIG. 5 shows one of the segments in which a linear pattern 20 is located, the segment having been obtained by dividing the defect map in the manner described in the first embodiment. It can be seen from FIG. 5 that the linear pattern which appears to be a continuous string when the entire wafer is viewed broadly do not show any regularity when the wafer is divided into microscopic segments in the manner described in the first embodiment. The correlation coefficient R for the defect group in FIG. 5 is 0.01. Thus, the linear patterns 20 shown in FIG. 4 cannot be detected by the detection method according to the first embodiment.

Figure 6:
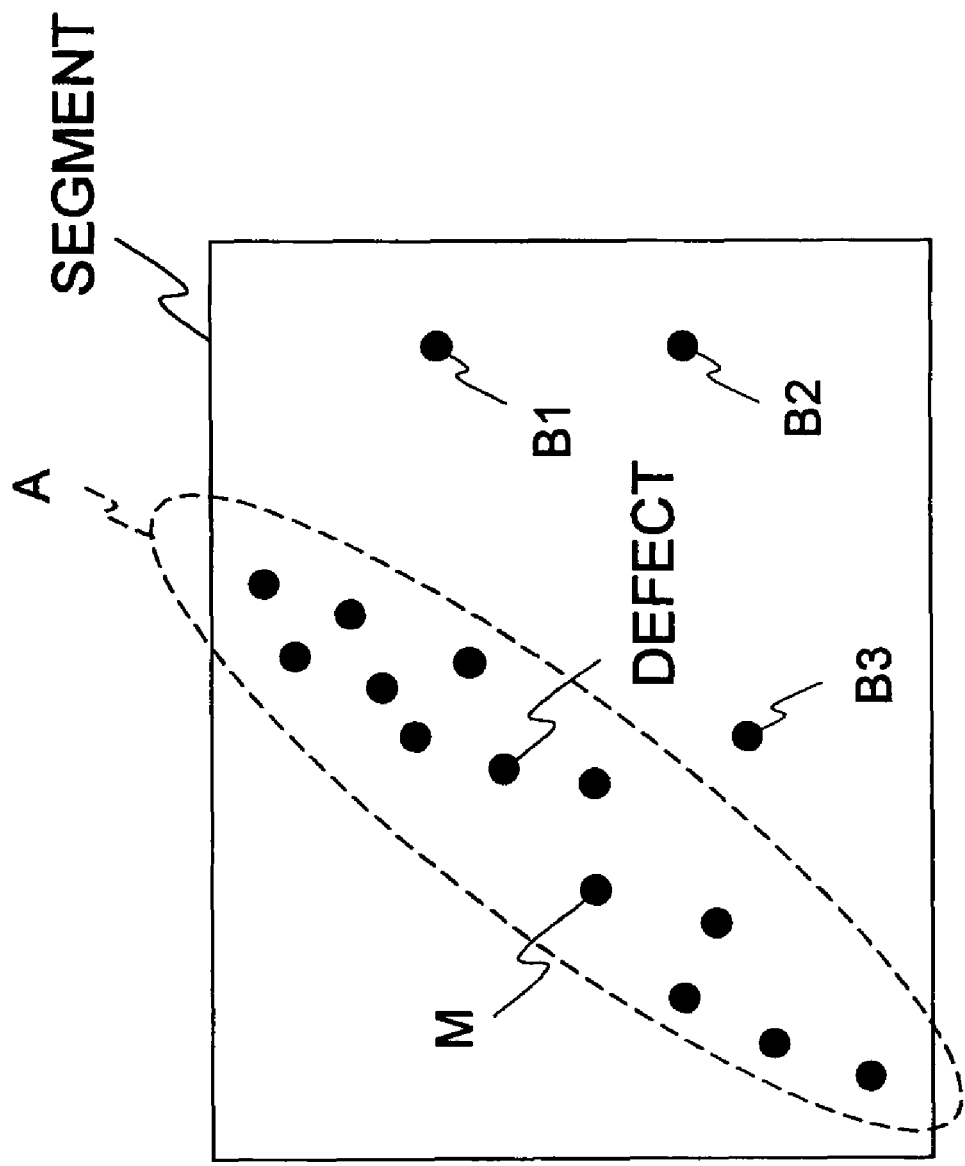
FIG. 6 is a diagram showing a distribution of defects in an enlarged segment.

Next, a case will be described that the detection method according to the present embodiment is used for the defect map shown in FIG. 4. According to the present embodiment, by increasing segment size, the region 2 occupied by each semiconductor chip is divided into 5 by 5 segments. FIG. 6 is an enlarged view of a segment in which a linear pattern 20 is located. In can be seen from Part A of FIG. 6 that the defects which form the linear pattern 20 are placed regularly in a fixed direction, being scattered to some extent of width. On the other hand, it can also be seen that there are defects, such as B1, B2, and B3 in FIG. 6, which are considered to be random defects rather than form the linear pattern.

In the first embodiment, the correlation coefficient is determined using all the defects in the segment. However, in the case of a defect distribution such as shown in FIG. 6, even if there is a linear pattern in Part A, the defects B1, B2, and B3 which does not form the linear pattern lower the value of the correlation coefficient. The correlation coefficient calculated using all the defects in the segment in FIG. 6 is 0.56, and it cannot be said that there is a statistically significant regularity. This problem is caused by the random defects mixed in as a result of the segment size increase.

Thus, according to the second embodiment, an outlier rejection algorithm is used before the correlation coefficient is determined. The outlier rejection algorithm removes defects other than those included in the linear pattern from the segments as outliers. That is, by executing the outlier rejection algorithm, the detection method extracts only the defects included in the linear pattern.

Figure 7:
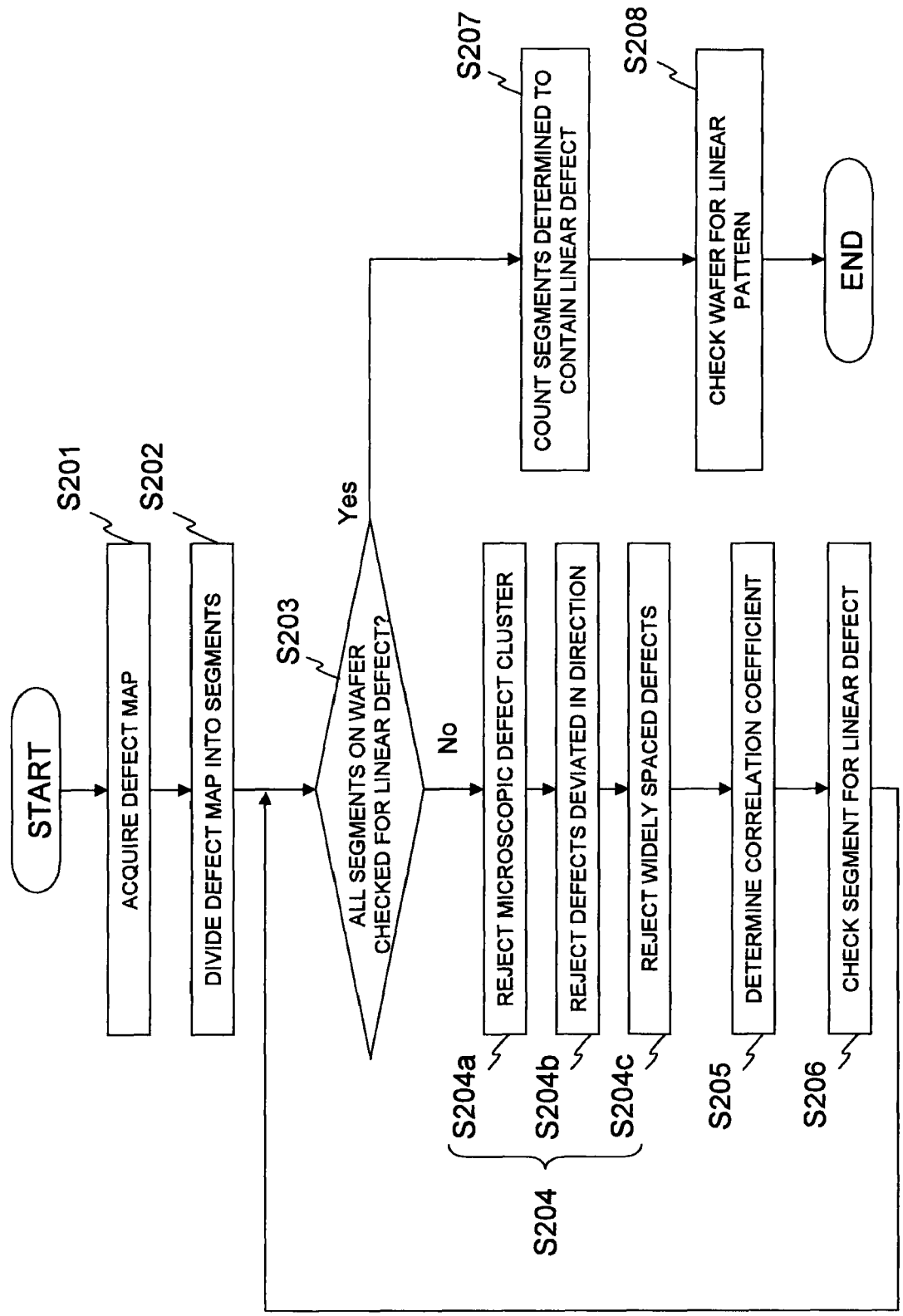
FIG. 7 is a flowchart of a detection method according to a second embodiment.

The detection method according to the second embodiment will be described in more detail below with reference to a flowchart in FIG. 7.

First, the detection method acquires a defect map containing coordinate data on defects detected as a result of defect inspection (Step S201).

Next, the detection method divides the acquired defect map into large-size segments as described above (Step S202). The region 2 occupied by each semiconductor chip formed on a wafer is divided into $m_2$ by $m_2$ segments ($m_2=5$). Incidentally, the regions to be divided are not limited to those occupied by semiconductor chips.

Next, the detection method determines whether all segments on the wafer have been checked for a linear defect (Step S203). If all the segments have been checked, the detection method goes to Step S207. Otherwise, the detection method goes to Step S204.

Step S204, which is carried out using the outlier rejection algorithm, includes three steps S204a, S204b, and S204c.

First, a microscopic defect cluster, i.e., a group of defects clustered in one location is rejected (Step S204a). For that, the region 2 occupied by each semiconductor chip is divided into n by n sub-regions (n=50). The defects in a sub-region are represented by a single defect if the sub-region contains two or more defects. The single defect which represents the defect cluster can be selected arbitrarily. That is, a defect group made up of defects very close to each other is represented by one of the defects. In the segment in FIG. 6, defect B1 is actually a defect group made up of 10 defects clustered together, and thus represented by one of the defects.

Next, defects which deviate from the direction are rejected from the defect group (Step S204b). For that, position of the barycenter M of the defect group in the segment is determined first assuming that all the defects have the same mass. Then, the segment is divided into 36 subsegments around the position of the barycenter M at intervals of 10 degrees. The number of defects in each of the resulting subsegments is counted. Then, leaving the defects contained in the subsegment with the largest number of defects and the defects contained in the 180-degree opposite subsegment, the other defects are rejected. However, defects located near the barycenter M is retained regardless of their orientation. The determination as to whether a defect is located near the barycenter M is made by comparing distance from the barycenter M with a threshold. Specifically, the defect is determined to be located near the barycenter M if the distance from the barycenter M is equal to or smaller than the threshold, and to be not located near the barycenter M if the distance from the barycenter M is larger than the threshold. According to the present embodiment, one tenth the side of the region 2 occupied by the semiconductor chip is used as the threshold. As a result, in the segment in FIG. 6, the barycentric position is found to be located at M, and defects B1 and B2 are rejected while the defects in Part A and defect B3 are retained.

Next, widely spaced defects are rejected (Step S204c). For that, each of the defects retained in Step S204b has its distance (closest inter-defect distance) from the closest defect calculated. Any defect whose closest inter-defect distance is equal to or larger than a predetermined threshold is rejected. According to the present embodiment, "ave+3σ" is used as the threshold, where "ave" is an average of the closest inter-defect distances and "σ" is standard deviation. As a result, in the segment in FIG. 6, defect B3 is rejected.

The outlier rejection algorithm makes it possible to extract only defects which form the linear pattern in Part A.

After executing the outlier rejection algorithm, the detection method finds the correlation coefficient for the defect group made up of the extracted defects (Step S205). In the case of the segment in FIG. 6, the correlation coefficient is 0.86.

Next, the detection method checks the segment for any linear defect (Step S206). Since the defect group in Part A of FIG. 6 is larger in width than the defect group in FIG. 2, the correlation coefficient takes a slightly lower value even if the outlier rejection algorithm is applied. Thus, to check each segment for any linear defect, the threshold for the correlation coefficient is set to 0.8. An equal or larger value is determined to indicate the existence of a linear defect in the segment.

When all the segments on the wafer have been checked for a linear defect, the detection method finds a count value by counting the total number of segments with a correlation coefficient equal to or larger than the threshold (Step S207).

Finally, the detection method determines whether the wafer contains a linear pattern (Step S208). Specifically, by comparing the count value obtained in Step S207 with a threshold, the detection method determines that the wafer contains a linear pattern if the count value is equal to or larger than the threshold. According to the present embodiment, the threshold for the count value is 10.

In the case of the defect map shown in FIG. 4, the count value is 30, and thus it is determined that the wafer contains a linear pattern.

The linear pattern detected by the detection method according to the second embodiment will be referred to as a type II linear pattern. Thus, it is determined that the defect map shown in FIG. 4 contains a type II linear pattern. The type II linear pattern is a linear pattern which is similar to the type I linear pattern when viewed macroscopically, but which contains defects placed at slightly wide intervals, being scattered to some extent of width when viewed microscopically.

Also, the detection method according to the present embodiment can detect such a linear pattern even when skipped measurements are taken in defect inspection. For example, if defect inspection is conducted on every other segment line, the count value will be 15, which is larger than the count value threshold. Thus, the type II linear pattern can be detected sufficiently.

Also, the detection method according to the present embodiment can detect a type II linear pattern even if the defect map contains random defects. This is because the detection method rejects random defects mixed in the segment by increasing segment size, using the outlier rejection algorithm.

As described above, by extracting features of the microscopic defect distribution profile, the second embodiment makes it possible to detect type II linear patterns even if skipped measurements are taken.

Third Embodiment

Next, a linear pattern detection method according to the third embodiment will be described. The detection method according to the present embodiment detects a linear pattern which is a faint linear pattern when viewed macroscopically, and which contains defects placed at wide intervals when viewed microscopically.

Figure 8:
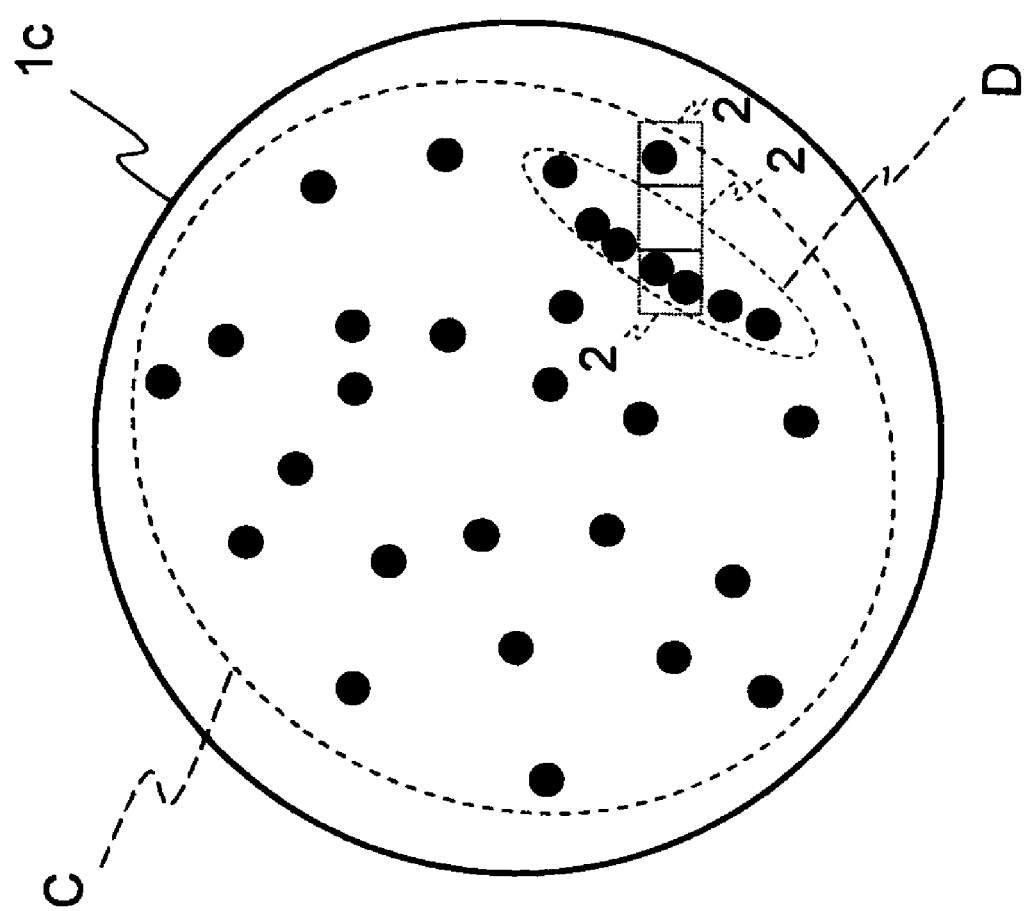
FIG. 8 is a diagram showing an example of a defect map.

FIG. 8 shows a defect map containing such a linear pattern. It can be seen from FIG. 8 that there are random defects all over a wafer map 1c (Part C) and that there is a linear pattern among the random defects (Part D). The linear pattern has wide intervals between points which make up a point sequence. Consequently, the defects which form the linear pattern are hardly contained in the segment, and thus it is not possible to detect the linear pattern using the segment-based detection method according to the first or second embodiment. Also, the defects which form the linear pattern and other defects are contained in the segment in almost equal proportions, and thus the outlier rejection algorithm described in the second embodiment is not applicable.

Contrary to the division into segments according to the first and second embodiments, segments are joined according to the present embodiment. When an area is expanded by combining segments, a lot of defects other than those of a linear pattern can get mixed in, and thus it becomes important to reject such defects.

Thus, effective segments are extracted based on the number of defects contained in segments, the outlier rejection algorithm is applied to the effective segments, and the correlation coefficient is calculated. Also, effective segments adjoining each other are joined to expand an area, the outlier rejection algorithm is applied to the joined effective segments, and the correlation coefficient is calculated.

Figure 10:
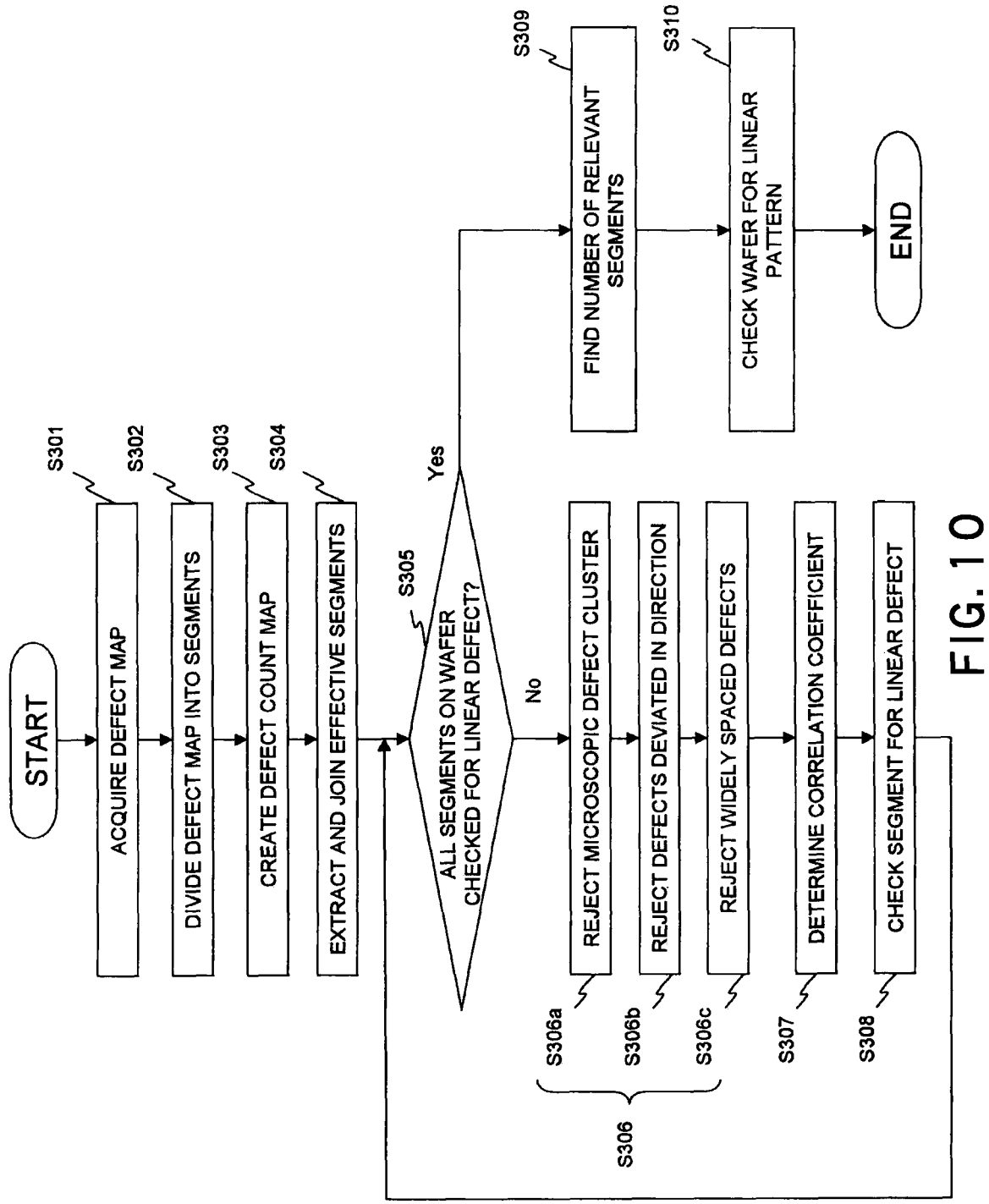
FIG. 10 is a flowchart of a detection method according to a third embodiment.

The detection method according to the third embodiment will be described in more detail below with reference to a flowchart in FIG. 10.

First, the detection method acquires a defect map containing coordinate data on defects detected as a result of defect inspection (Step S301).

Next, the detection method divides the acquired defect map into segments (Step S302). According to the present embodiment, a region 2 occupied by each semiconductor chip formed on a wafer is divided into $m_3$ by $m_3$ segments ($m_3$=3). Incidentally, the regions to be divided are not limited to those occupied by semiconductor chips.

Next, the detection method counts the number of defects in each segment and creates a defect count map which maps defect counts on a segment-by-segment basis (Step S303). A defect count map corresponding to the defect map in FIG. 8 is created. In Part C containing random defects, the number of defects in each segment is approximately 0 or 1. On the other hand, in Part D containing a linear pattern, the number of defects in each segment is approximately a few defects.

Figure 9:
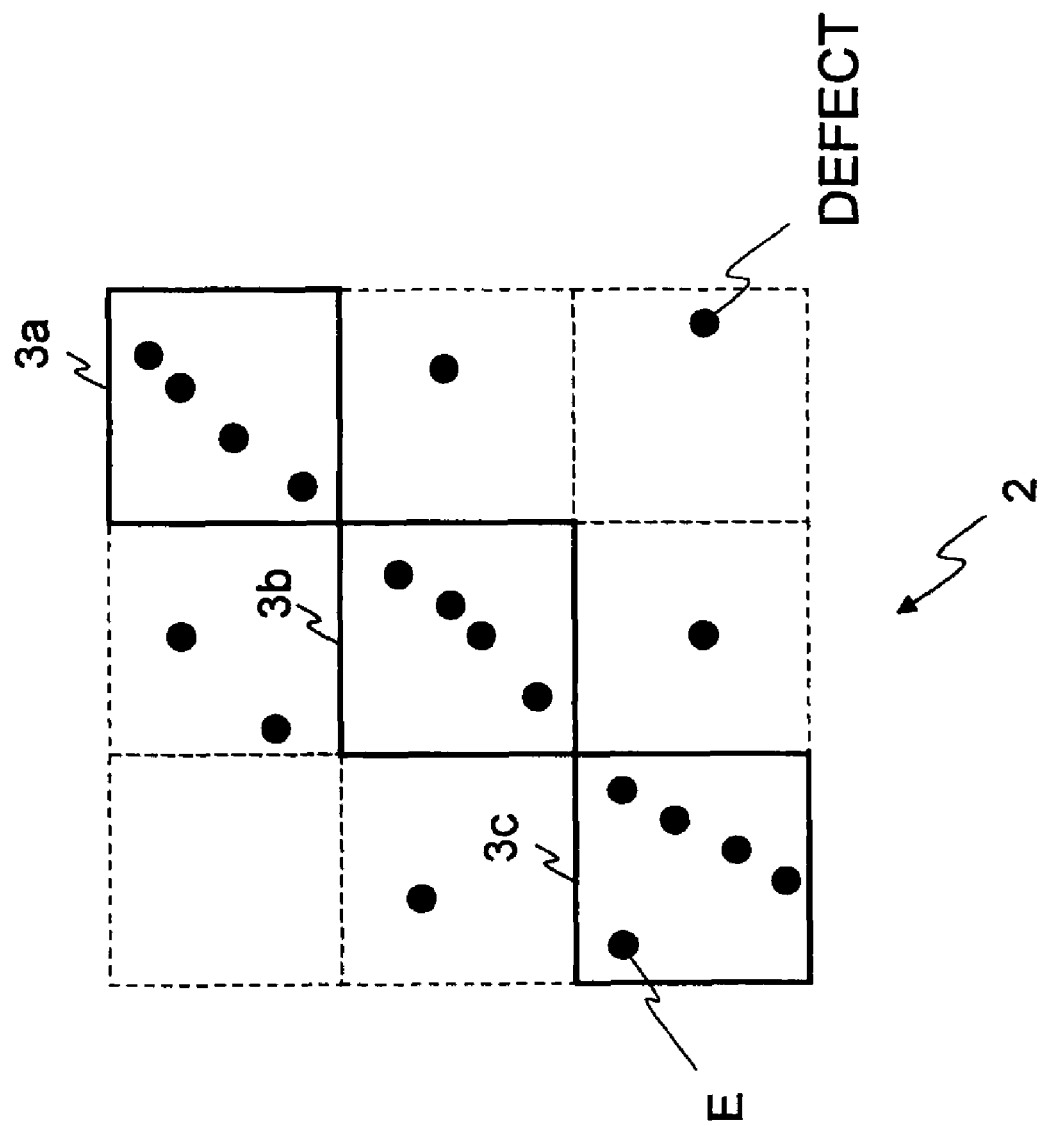
FIG. 9 is a diagram showing a distribution of defects in joined segments.

Next, the detection method sets a threshold on the defect count map, extracts segments containing an equal or larger number of defects to or than the threshold (hereinafter referred to as effective segments), and joins adjacent effective segments (Step S304). According to the present embodiment, the threshold is three defects per segment. FIG. 9 shows the region 2 occupied by a semiconductor chip and located in Part D (FIG. 8) which contains a linear pattern. In FIG. 9, effective segments 3a, 3b, and 3c are boxed with solid lines. Since the segments adjoin each other, they are joined together to form a single segment. The joined effective segments go through subsequent Steps S306 to S308. If the segment 3b is not an effective segment, the effective segments 3a and 3c are not joined and the segments go individually through Steps S306 to S308 described later. If the effective segment 3a or 3c adjoins an effective segment (not shown) in an adjacent region 2, the adjacent effective segments may be joined.

Next, the detection method determines whether all effective segments on the wafer have been checked for a linear defect (Step S305). If all the segments have been checked, the detection method goes to Step S309. Otherwise, the detection method goes to Step S306.

Step S306, which is carried out using the outlier rejection algorithm, includes three steps S306a, S306b, and S306c.

First, a microscopic defect cluster, i.e., a group of defects clustered in one location is rejected (Step S306a). For that, the region 2 occupied by each semiconductor chip is divided into n by n sub-regions (n=50). The defects in a sub-region are represented by a single defect if the sub-region contains two or more defects. The single defect which represents the defect cluster can be selected arbitrarily. That is, a defect group made up of defects very close to each other is represented by one of the defects.

Next, defects which deviate from the direction are rejected from the defect group (Step S306b). For that, position of the barycenter M of the defect group in the segment is determined first assuming that all the defects have the same mass. Then, the segment is divided into 36 subsegments around the position of the barycenter M at intervals of 10 degrees. The number of defects in each of the resulting subsegments is counted. Then, leaving the defects contained in the subsegment with the largest number of defects and the defects contained in the 180-degree opposite subsegment, the other defects are rejected. However, defects located near the barycenter M is retained regardless of their orientation. The determination as to whether a defect is located near the barycenter M is made by comparing distance from the barycenter M with a threshold. Specifically, the defect is determined to be located near the barycenter M if the distance from the barycenter M is equal to or smaller than the threshold, and to be not located near the barycenter M if the distance from the barycenter M is larger than the threshold. According to the present embodiment, one tenth the side of the region 2 occupied by the semiconductor chip is used as the threshold.

Next, widely spaced defects are rejected (Step S306c). For that, each of the defects retained in Step S306b has its distance (closest inter-defect distance) from the closest defect calculated. Any defect whose closest inter-defect distance is equal to or larger than a predetermined threshold is rejected. According to the present embodiment, "ave+3σ" is used as the threshold, where "ave" is an average of the closest inter-defect distances and "σ" is standard deviation.

When the outlier rejection algorithm is applied to the joined effective segments in FIG. 9, defect E is rejected.

After executing the outlier rejection algorithm, the detection method finds the correlation coefficient for the defect group made up of the extracted defects (Step S307). In the case of the joined effective segments in FIG. 9, the correlation coefficient is 0.82.

Next, the detection method checks the segment for any linear defect (Step S308). To check each segment for a linear defect, the threshold for the correlation coefficient is set to 0.75. An equal or larger value is determined to indicate the existence of a linear defect in the segment.

When all the effective segments on the wafer have been checked for a linear defect, the detection method finds the number of relevant segments in the whole wafer (Step S309). The number of relevant segments is the number of effective segments contained in the region 2 and determined to contain a linear defect. In FIG. 9, since a linear defect is found in a joint segment of three effective segments 3a, 3b, and 3c, the number of relevant segments is 3.

Finally, the detection method determines whether the wafer contains a linear pattern (Step S310). It is determined that the wafer contains a linear pattern if the number of relevant segments is equal to or larger than a threshold. According to the present embodiment, 5 is used as the threshold. On the defect map in FIG. 8, the number of relevant segments is 14, and thus it can be determined that the wafer contains a linear pattern.

The linear pattern detected by the detection method according to the third embodiment will be referred to as a type III linear pattern. Thus, it is determined that the defect map shown in FIG. 8 contains a type III linear pattern. The type III linear pattern is a faint linear pattern when viewed macroscopically, and is a linear pattern containing defects placed at wide intervals when viewed microscopically.

Also, the detection method according to the present embodiment can detect such a linear pattern even when skipped measurements are taken in defect inspection. For example, if defect inspection is conducted on every other segment line, the number of relevant segments will be 7, which is larger than the threshold for the number of relevant segments. Thus, the linear pattern can be detected sufficiently.

Also, the detection method according to the present embodiment can detect a type III linear pattern even if the defect map contains random defects. This is because the detection method extracts effective segments based on the number of defects contained in segments, joins adjacent effective segments together to form a joint segment, thereby reducing the ratio of random defects to all the defects contained in the joint segment, subsequently applies the outlier rejection algorithm to the joint segment, and thereby removes the random defects.

As described above, by extracting features of the microscopic defect distribution profile, the third embodiment makes it possible to extract and detect type III linear patterns even if skipped measurements are taken.

Methods for detecting type I to type III linear patterns based on differences in the microscopic defect distribution profile have been described so far. Now, features of linear pattern detection methods and uses of detection results will be described below.

Figure 14:
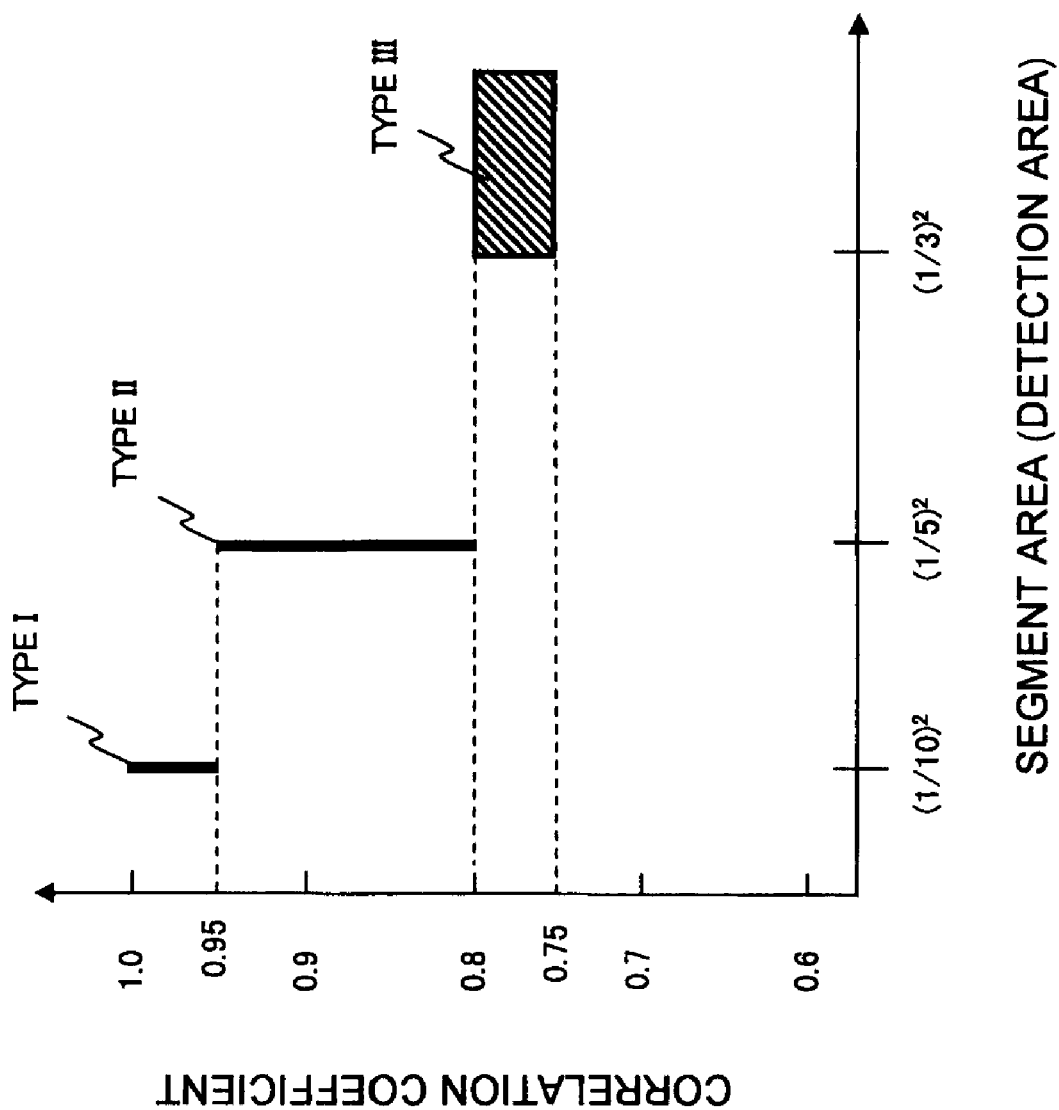
FIG. 14 is a diagram showing classification of linear patterns according to a relationship between segment area and correlation coefficient.

FIG. 14 is a diagram showing classification of linear patterns according to a relationship between segment area (detection area) and correlation coefficient. In the case of a type I linear pattern, as described in the first embodiment, the area of a segment is $(1/10)^2$ the area of the region occupied by the semiconductor chip and the decision threshold for the correlation coefficient is 0.95. Similarly, in the case of a type II linear pattern, the area of a segment is $(1/5)^2$ the area of the region occupied by the semiconductor chip and the decision threshold for the correlation coefficient is 0.8. In the case of a type III linear pattern, the area of a segment is $(1/3)^2$ or above the area of the region occupied by the semiconductor chip and the decision threshold for the correlation coefficient is 0.75. The area of a segment becomes larger than $(1/3)^2$ when adjacent effective segments are joined, as described above.

Thus, it can be seen that a feature of the detection methods according to embodiments of the present invention is that the decision threshold for the correlation coefficient is lowered with increases in the area of the segment to be checked for a linear pattern.

That is, according to the first embodiment, in a very small segment with an area $(1/10)^2$ the area of the region occupied by the semiconductor chip, the threshold for the correlation coefficient is set to 0.95 to detect a high regularity.

According to the second embodiment, in a slightly large segment with an area $(1/5)^2$ the area of the region occupied by the semiconductor chip, the threshold for the correlation coefficient is set to 0.8 to detect a slightly weaker regularity.

According to the third embodiment, in a large segment with an area $(1/3)^2$ or above the area of the region occupied by the semiconductor chip, the threshold for the correlation coefficient is set to 0.75 to detect a still weaker regularity.

Another feature of the detection methods according to the embodiments of the present invention is that a more powerful rejection process is performed with increases in the area of the segment (detection region) to reject defects other than those included in a linear pattern, followed by calculation of the correlation coefficient.

Next, uses of detection results will be described.

Types and culprit processes of linear patterns were investigated. As a result, it was found that linear patterns classified into type I mainly occurred in a CMP (Chemical Mechanical Polish) process, that linear patterns classified into type II mainly occurred in a resist application process of an exposure process, and that linear patterns classified into type III mainly occurred in a transport process.

In this way, since the type I to type III linear patterns can have various different causes, by detecting linear patterns on a type-by-type basis using the detection method according to any of the first to third embodiments, it is possible to identify the culprit processes quickly. Then, by taking measures for the identified process, it is possible to improve yields.

Fourth Embodiment

Figure 11:
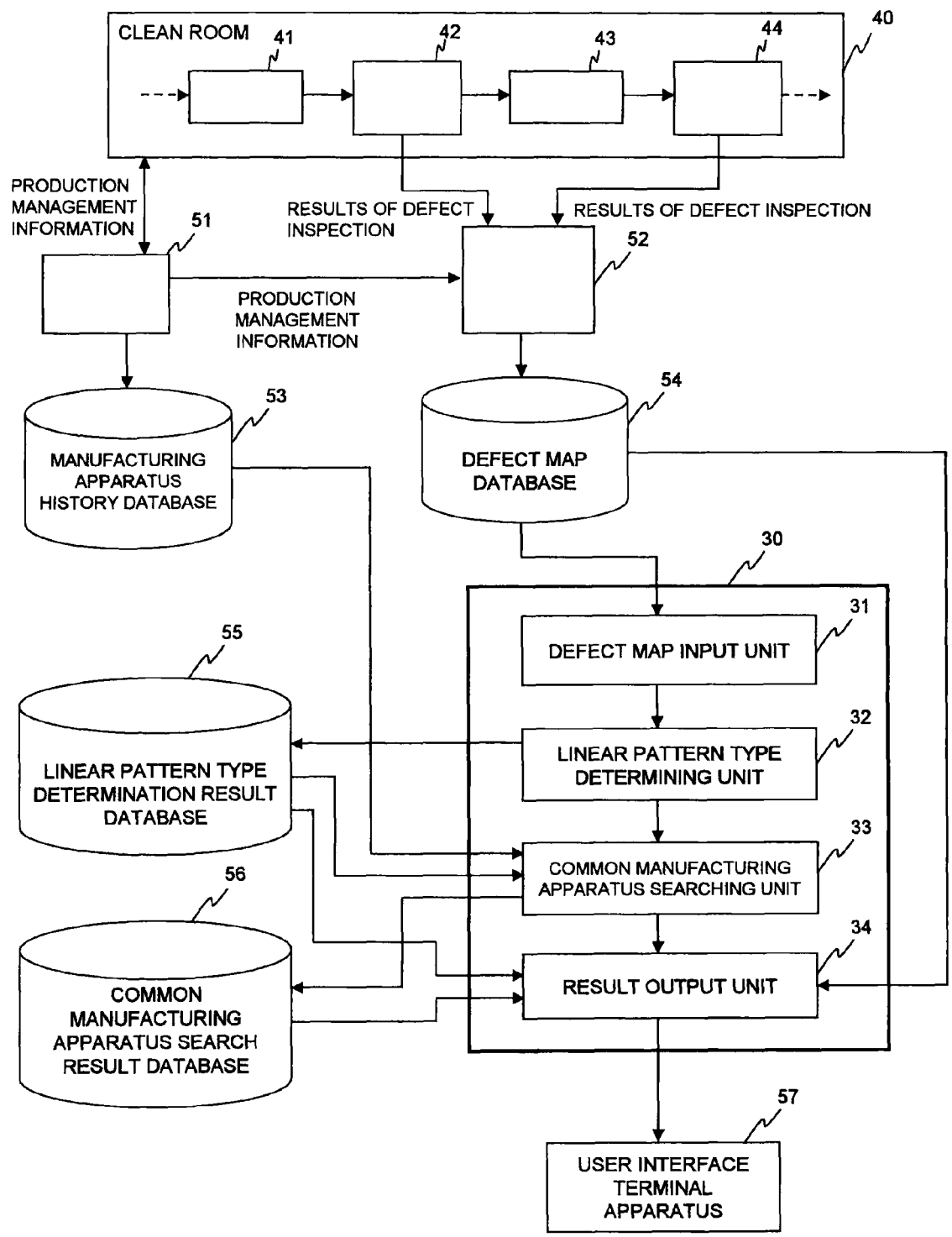
FIG. 11 is a schematic block diagram showing a semiconductor manufacturing system which includes an analyzing apparatus according to a fourth embodiment.

FIG. 11 shows a schematic configuration of a semiconductor manufacturing system which includes an analyzing apparatus 30 according to the present embodiment. In addition to the analyzing apparatus 30, the semiconductor manufacturing system includes a clean room 40, production management server 51, defect map server 52, manufacturing apparatus history database 53, defect map database 54, linear pattern type determination result database 55, common manufacturing apparatus search result database 56, and user interface terminal apparatus 57.

The clean room 40 includes manufacturing apparatuses 41 and 43 as well as defect inspection apparatuses 42 and 44. After a wafer process performed by the manufacturing apparatuses 41 and 43, defect inspections of wafers are performed by the respective defect inspection apparatuses 42 and 44. As a result of the defect inspections, a defect map is created by mapping locations of abnormality and foreign matter on a circuit pattern to a wafer map.

The production management server 51 communicates production management information with the clean room 40. The production management information contains wafer IDs used to identify wafers. The production management server 51 outputs the production management information to the defect map server 52.

Based on the production management information received from the production management server 51 and the results of defect inspections received from the defect inspection apparatuses 42 and 44, the defect map server 52 stores the defect maps in the defect map database 54 by associating the defect maps with wafer IDs.

The manufacturing apparatus history database 53 receives information about correspondence between a manufacturing apparatus and the wafer IDs of the wafers processed by the manufacturing apparatus from the production management server 51. For each manufacturing apparatus, the manufacturing apparatus history database 53 stores the wafer IDs of the wafers processed by the manufacturing apparatus. For example, if a manufacturing apparatus with an ID of "A" has processed wafers with odd ID numbers, the information about the manufacturing apparatus is stored using a data structure: (manufacturing apparatus ID; wafer IDs)=(A; 1, 3, 5, . . . ).

The linear pattern type determination result database 55 stores the type of linear pattern detected on the wafer surface, on a wafer-by-wafer basis. For example, if a type I linear pattern has been detected, but no type II or type III linear pattern has been detected on a wafer with a wafer ID of "1," the information is stored using a data structure: (wafer ID; type I; type II; type III)=(1; ○; x; x).

For each type of linear pattern, the common manufacturing apparatus search result database 56 stores the ID of the manufacturing apparatus estimated to have caused the linear pattern. For example, if it is estimated that a type I linear pattern has been caused by a manufacturing apparatus with an ID of "B," the information is stored using a data structure: (type I; manufacturing apparatus ID)=(1; B).

The analyzing apparatus 30 checks each wafer for any of type I to type III linear patterns, analyzes the manufacturing apparatus which is causing the defects, and outputs results to the user interface terminal apparatus 57.

The analyzing apparatus 30 includes a defect map input unit 31, linear pattern type determining unit 32, common manufacturing apparatus searching unit 33, and result output unit 34.

Figure 12:
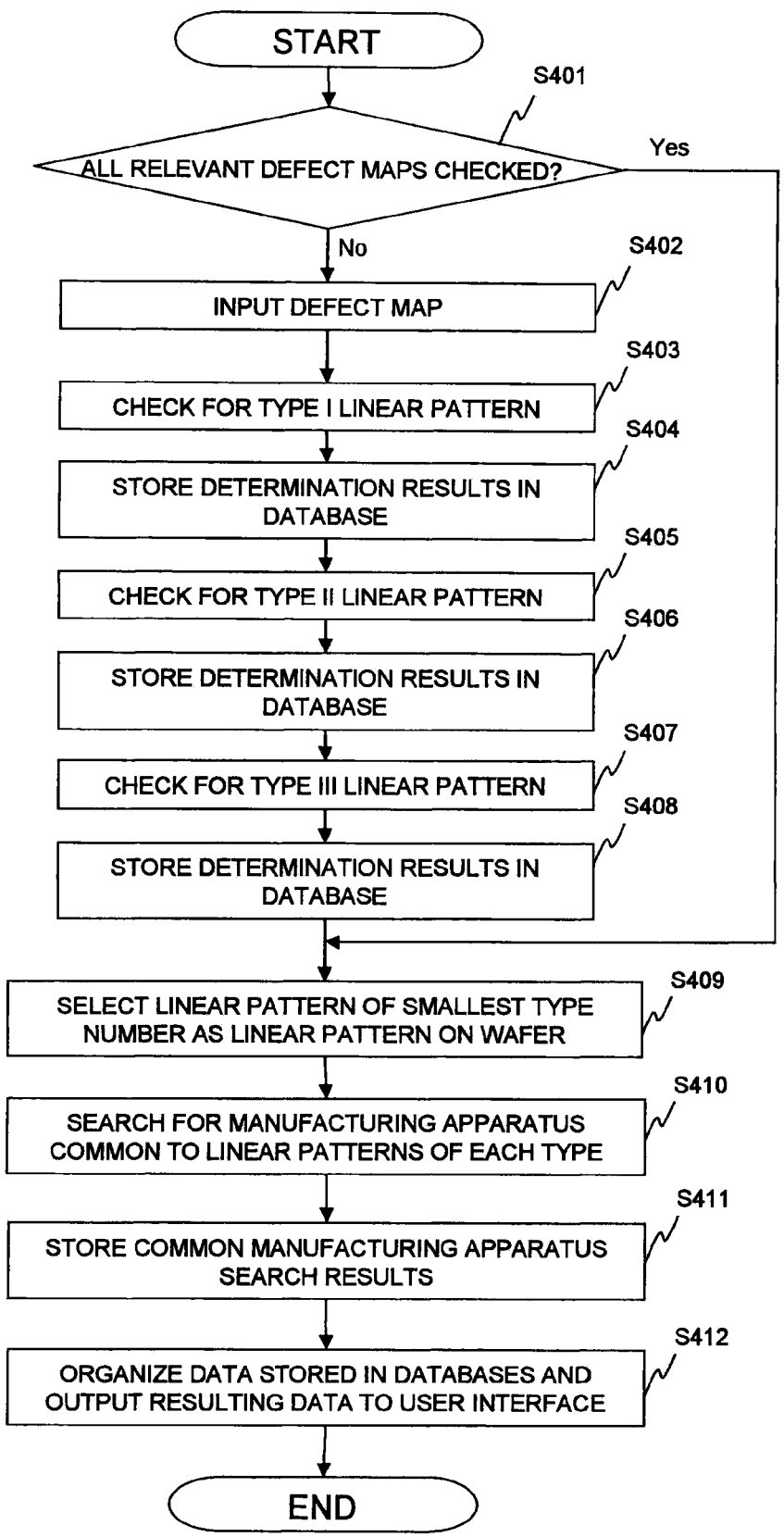
FIG. 12 is a flowchart of a detection method according to the fourth embodiment.

Next, process details of the analyzing apparatus 30 will be described with reference to a flowchart in FIG. 12.

If it is found in Step S401 that all defect maps to be analyzed have been checked for a linear pattern, the analyzing apparatus 30 goes to Step S409. Otherwise, the analyzing apparatus 30 goes to Step S402.

In Step S402, a defect map associated with a wafer ID is inputted in the defect map input unit 31 from the defect map database 54. Then, the defect map input unit 31 outputs the defect map to the linear pattern type determining unit 32.

The linear pattern type determining unit 32 of the analyzing apparatus 30 carries out Steps S403 to S408 to check for each type of linear pattern.

In Step S403, the linear pattern type determining unit 32 performs the detection method according to the first embodiment to determine whether there is a type I linear pattern.

In Step S404, the linear pattern type determining unit 32 stores determination results in the linear pattern type determination result database 55.

In Step S405, the linear pattern type determining unit 32 performs the detection method according to the second embodiment to determine whether there is a type II linear pattern.

In Step S406, the linear pattern type determining unit 32 stores determination results in the linear pattern type determination result database 55.

In Step S407, the linear pattern type determining unit 32 performs the detection method according to the third embodiment to determine whether there is a type III linear pattern.

In Step S408, the linear pattern type determining unit 32 stores determination results in the linear pattern type determination result database 55.

In Step S409, the common manufacturing apparatus searching unit 33 of the analyzing apparatus 30 selects the linear pattern of the smallest type number out of the detected linear patterns as a linear pattern on the wafer.

For example, if linear patterns of all types I to III are detected on the defect map with a wafer ID of "1" as a result of the determinations described above, the type of linear pattern on the wafer is regarded to be type I. Specifically, the common manufacturing apparatus searching unit 33 changes the data structure which represents wafer-by-wafer determination results so as to indicate that only the linear pattern of the highest priority has been detected out of all the detected types. This procedure is carried out for all the wafer IDs under analysis.

The priority may be assigned arbitrarily. That is, the second smallest type number or the largest type number may be selected as the type of linear pattern on the wafer.

Also, Step S409 may be carried out by the linear pattern type determining unit 32. In that case, the linear pattern type determining unit 32 changes the data structure which represents wafer-by-wafer determination results, according to predetermined priorities, so as to indicate that only the linear pattern of the highest priority has been detected out of all the detected types. Then, the changed data structure is stored in the linear pattern type determination result database 55.

In Step S410, the common manufacturing apparatus searching unit 33 of the analyzing apparatus 30 searches for a manufacturing apparatus common to linear patterns of each type. Specifically, based on data stored in the manufacturing apparatus history database 53 and linear pattern type determination result database 55, the common manufacturing apparatus searching unit 33 searches for a manufacturing apparatus common to linear patterns of each type by checking whether the wafers on which the linear patterns are detected have been processed on the same manufacturing apparatus. Search results are statistically processed, and if statistical significance is found, the manufacturing apparatus is picked up as a suspect.

In Step S411, the common manufacturing apparatus searching unit 33 of the analyzing apparatus 30 stores the ID of the manufacturing apparatus picked up in the common manufacturing apparatus search result database 56.

In Step S412, the result output unit 34 of the analyzing apparatus 30 organizes the data stored in the defect map database 54, linear pattern type determination result database 55, and common manufacturing apparatus search result database 56 and outputs the resulting data to the user interface terminal apparatus 57. An example of outputted data is shown in FIG. 13, which shows analysis results of defect maps of six wafers (wafer ID=1 to 6). Specifically, as shown in FIG. 13, the user interface terminal apparatus 57 displays the IDs of detected wafers, ID of a suspected manufacturing apparatus, and defect maps, for each type of linear pattern. The output results make it possible to identify the manufacturing apparatus which is causing the defects.

Although it has been stated that linear patterns of all types I to III are checked for, only a desired type may be checked for by performing at least one of the detection methods.

Also, at least part of the analyzing apparatus 30 described in the embodiments of the present invention may be implemented either by hardware or by software. When the analyzing apparatus 30 is implemented by software, programs which implement at least part of functions of the analyzing apparatus 30 may be stored on a recording medium such as a flexible disk or CD-ROM, and loaded on and executed by a computer. The recording medium is not limited to a removable one such as a magnetic disk or optical disk, and may be a fixed recording medium such as a hard disk drive or memory.

Also, the programs which implement at least part of the functions of the analyzing apparatus 30 may be distributed via communication lines (including wireless communication lines) such as the Internet. Also, the programs may be distributed in an encrypted, modulated, or compressed form via wired or wireless communication lines, such as the Internet, or by being stored on a recording medium.

As described above, by classifying linear patterns into type I to type III linear patterns based on differences in the microscopic defect distribution profile, the embodiments of the present invention can identify the manufacturing apparatus which is causing the defects. Then, by taking measures for the identified manufacturing apparatus, it is possible to improve yields.

Additional advantages and modifications will readily occur to those skilled in the art.

Therefore, the invention in its broader aspects is not limited to the specific details and representative embodiments shown and described herein.

Accordingly, various modifications may be made without departing from the spirit or scope of the general inventive concepts as defined by the appended claims and their equivalents.

The invention claimed is:

1. A linear pattern detection method comprising:
   acquiring a defect map created based on results of defect inspection of a wafer;
   dividing the defect map into a plurality of first segments;
   calculating, by an analyzing apparatus, a correlation coefficient of a point sequence in each of the first segments, the point sequence corresponding to a defect group contained in the first segments;
   calculating, by the analyzing apparatus, a total number of those first segments in which the correlation coefficient is equal to or larger than a first threshold; and
   determining, by the analyzing apparatus, that the wafer contains a linear pattern if the total number is equal to or larger than a second threshold.

2. The linear pattern detection method according to claim 1, wherein the defect map is created based on the defect inspection conducted only on part of semiconductor chips on a wafer surface.

3. The linear pattern detection method according to claim 1, wherein after the defect map is divided into the plurality of first segments, but before the correlation coefficient is calculated, an outlier rejection algorithm is applied to the first segments to extract only defects which form a linear pattern from the defect group contained in the first segments.

4. The linear pattern detection method according to claim 3, wherein the defect map is created based on the defect inspection conducted only on part of semiconductor chips on a wafer surface.

5. The linear pattern detection method according to claim 3, wherein the outlier rejection algorithm:
   causes a defect cluster to be represented by a single defect, the defect cluster being a defect group clustered in one location and contained in the first segments;
   determines a barycenter of the defect group contained in the first segments, divides the first segment around the barycenter at predetermined angles into a plurality of second segments, designates a direction determined by the second segment with the largest number of defects as a direction of the defect group, and rejects defects which deviate from the direction;

calculates the closest inter-defect distance of each of the defects, the inter-defect distance being the distance of the each defect from an adjacent closest defect; and compares the closest inter-defect distance of the each defect with a third threshold, and rejects any defect whose closest inter-defect distance is equal to or larger than the third threshold.

6. The linear pattern detection method according to claim 5, wherein the third threshold is determined based on an average and standard deviation of the closest inter-defect distances.

7. A linear pattern detection method comprising:
acquiring a defect map created based on results of defect inspection of a wafer;
dividing the defect map into a plurality of first segments;
extracting those first segments which contain an equal or larger number of defects than a predetermined threshold as effective segments;
creating joint segments by joining adjacent effective segments;
applying an outlier rejection algorithm to the joint segments to extract only defects which form a linear pattern from a defect group contained in the joint segments;
calculating, by an analyzing apparatus, a correlation coefficient of a point sequence in each of the joint segments, the point sequence corresponding to a defect group contained in the joint segments;
calculating, by the analyzing apparatus, a total number of effective segments in those joint segments in which the correlation coefficient is equal to or larger than a first threshold; and
determining, by the analyzing apparatus, that the wafer contains a linear pattern if the total number is equal to or larger than a second threshold.

8. The linear pattern detection method according to claim 7, wherein the defect map is created based on the defect inspection conducted only on part of semiconductor chips on a wafer surface.

9. The linear pattern detection method according to claim 8, wherein the outlier rejection algorithm:
causes a defect cluster to be represented by a single defect, the defect cluster being a defect group clustered in one location and contained in the joint segments;
determines a barycenter of the defect group in the joint segments, divides the joint segment around the barycenter at predetermined angles into a plurality of second segments, designates a direction determined by the second segment with the largest number of defects as a direction of the defect group, and rejects defects which deviate from the direction;
calculates the closest inter-defect distance of each of the defects, the inter-defect distance being the distance of the each defect from an adjacent closest defect; and
compares the closest inter-defect distance of the each defect with a third threshold, and rejects any defect whose closest inter-defect distance is equal to or larger than the third threshold.

10. The linear pattern detection method according to claim 9, wherein the third threshold is determined based on an average and standard deviation of the closest inter-defect distances.

11. The linear pattern detection method according to claim 7, further comprising applying the outlier rejection algorithm also to those effective segments which do not form a joint segment, calculating a correlation coefficient of a point sequence which corresponds to a defect group contained in the effective segments, increasing the total number if the correlation coefficient is equal to or larger than the first threshold.

12. The linear pattern detection method according to claim 7, wherein the outlier rejection algorithm:
causes a defect cluster to be represented by a single defect, the defect cluster being a defect group clustered in one location and contained in the joint segments;
determines a barycenter of the defect group in the joint segments, divides the joint segment around the barycenter at predetermined angles into a plurality of second segments, designates a direction determined by the second segment with the largest number of defects as a direction of the defect group, and rejects defects which deviate from the direction;
calculates the closest inter-defect distance of each of the defects, the inter-defect distance being the distance of the each defect from an adjacent closest defect; and
compares the closest inter-defect distance of the each defect with a third threshold, and rejects any defect whose closest inter-defect distance is equal to or larger than the third threshold.

13. The linear pattern detection method according to claim 12, wherein the third threshold is determined based on an average and standard deviation of the closest inter-defect distances.

14. An analyzing apparatus comprising:
a defect map input unit which acquires a defect map associated with a wafer ID from a defect map database;
a linear pattern type determining unit which performs a detection method for detecting, based on the defect map, whether at least one of a plurality of types of linear pattern is present, and stores a first data structure in a linear pattern type determination result database, the first data structure representing a type of linear pattern detected on each wafer;
a common manufacturing apparatus searching unit which acquires the first data structure from the linear pattern type determination result database, acquires a second data structure that represents the wafer ID of the wafer processed by each manufacturing apparatus represented by a manufacturing apparatus ID from a manufacturing apparatus history database, and performs a search process to search for a manufacturing apparatus common to linear patterns of each type based on the first and second data structures, and stores a third data structure in a common manufacturing apparatus search result database based on results of the search process, the third data structure representing the manufacturing apparatus ID of a manufacturing apparatus common to linear patterns of each type; and
a result output unit which outputs analysis results obtained by organizing the first data structure, the second data structure, and the third data structure to a user terminal.

15. The analyzing apparatus according to claim 14, wherein the analysis results include the wafer ID of each wafer on which each type of linear pattern has been detected and the manufacturing apparatus ID of a suspected manufacturing apparatus.

16. The analyzing apparatus according to claim 14, wherein when a plurality of types of linear pattern are detected, the linear pattern type determining unit changes the first data structure so as to indicate that only the linear pattern of the highest priority has been detected out of the plurality of detected types according to predetermined priorities and stores the changed first data structure in the linear pattern type determination result database.

17. The analyzing apparatus according to claim 14, wherein when the first data structure acquired from the linear pattern type determination result database indicates that a plurality of types of linear pattern has been detected, the common manufacturing apparatus searching unit changes the first data structure according to predetermined priorities so as to indicate that only the linear pattern of the highest priority has been detected out of the plurality of detected types, before performing the search process.

* * * * *